US012454863B2

(12) United States Patent
Rogers, III

(10) Patent No.: US 12,454,863 B2
(45) Date of Patent: Oct. 28, 2025

(54) SAFETY ROOF HATCH SYSTEM

(71) Applicant: Joseph O. Rogers, III, Columbia, SC (US)

(72) Inventor: Joseph O. Rogers, III, Columbia, SC (US)

( * ) Notice: Subject to any disclaimer, the term of this patent is extended or adjusted under 35 U.S.C. 154(b) by 861 days.

(21) Appl. No.: 17/711,163

(22) Filed: Apr. 1, 2022

(65) Prior Publication Data

US 2022/0220806 A1 Jul. 14, 2022

Related U.S. Application Data

(62) Division of application No. 16/029,347, filed on Jul. 6, 2018, now Pat. No. 11,293,226.

(60) Provisional application No. 62/620,557, filed on Jan. 23, 2018.

(51) Int. Cl.

| | |
|---|---|
| ***E06C 9/00*** | (2006.01) |
| ***E04D 13/00*** | (2006.01) |
| ***E06B 5/00*** | (2006.01) |
| ***E06C 7/02*** | (2006.01) |
| ***E06C 9/02*** | (2006.01) |
| ***E06C 9/08*** | (2006.01) |
| ***E06C 9/10*** | (2006.01) |
| *E06B 5/01* | (2006.01) |
| *E06C 1/12* | (2006.01) |

(52) U.S. Cl.

CPC ................ *E06C 9/10* (2013.01); *E04D 13/00* (2013.01); *E06B 5/00* (2013.01); *E06C 7/02* (2013.01); *E06C 9/02* (2013.01); *E06C 9/08* (2013.01); *E06B 5/01* (2013.01); *E06C 1/12* (2013.01)

(58) Field of Classification Search

CPC ..... E06C 9/02; E06C 9/08; E06C 9/10; E06C 7/02; E06C 7/181; E06C 7/182; E06C 7/183; E06C 1/12; E04D 13/00; E06B 5/01; E06B 5/00

See application file for complete search history.

(56) References Cited

U.S. PATENT DOCUMENTS 4,546,855 A * 10/1985 Lyons .................... E06C 7/182 182/8
4,933,615 A * 6/1990 Furuya .................. B60J 7/0573 318/265

(Continued)

FOREIGN PATENT DOCUMENTS

KR 20110009255 U * 9/2011 .............. E06C 9/02

*Primary Examiner* — Eret C McNichols
(74) *Attorney, Agent, or Firm* — COATS & BENNETT, PLLC

(57) ABSTRACT

A system is provided for safe access to a roof through an opening in a roof of a structure having a fixed ladder leading upward to the opening. The system includes a mechanism to drive a set of pushrods to raise a hatch covering the opening. The system may include a section of ladder secured to the underside of the hatch. The system may have an extendable ladder driven by the drive mechanism to slide along the fixed ladder and extend through the opening in the roof when the hatch is raised. The system may include a safety pole driven by the drive mechanism to extend through the opening in the roof when the hatch is raised. The system allows someone who needs to access the roof for inspection or maintenance to safely open the hatch, climb up through the opening in the roof, and safely step onto the roof.

7 Claims, 13 Drawing Sheets

(56) References Cited

U.S. PATENT DOCUMENTS

| | | | | | |
|---|---|---|---|---|---|
| 5,123,875 | A * | 6/1992 | Eubank | F24F 7/025 | 236/44 C |
| 6,260,662 | B1 * | 7/2001 | Meister | E06C 1/381 | 182/8 |
| 6,422,341 | B1 * | 7/2002 | Engdahl | E06C 9/02 | 182/103 |
| 6,572,182 | B2 * | 6/2003 | Lamparter | E05F 15/63 | 296/216.02 |
| 7,638,962 | B2 * | 12/2009 | Cardwell | E05F 15/622 | 318/443 |
| 8,369,057 | B2 * | 2/2013 | Bourgeois | E05F 15/70 | 361/111 |
| 8,522,487 | B2 * | 9/2013 | Whiting | E06C 7/182 | 52/72 |
| 8,763,756 | B1 * | 7/2014 | Kasi | E04F 11/064 | 182/78 |
| 11,293,226 | B2 * | 4/2022 | Rogers, III | E06C 9/10 | |
| 11,920,397 | B1 * | 3/2024 | MacKarvich | E05F 15/627 | |
| 2008/0098662 | A1 * | 5/2008 | Laffitte Figueras | E02D 29/1418 | 404/25 |
| 2019/0226280 | A1 * | 7/2019 | Rogers, III | E04F 11/06 | |
| 2021/0340816 | A1 * | 11/2021 | Helmick | E06C 7/182 | |
| 2022/0220806 | A1 * | 7/2022 | Rogers, III | E06C 7/02 | |

* cited by examiner

SAFETY ROOF HATCH SYSTEM

RELATED APPLICATION DATA

The present application is a Divisional of U.S. patent application Ser. No. 16/029,347 filed Jul. 6, 2018, which is related to and claims the benefit of commonly-owned and U.S. Provisional Patent Application No. 62/620,557 entitled SAFETY ROOF HATCH SYSTEM, filed on Jan. 23, 2018, which application is incorporated herein by reference in its entirety.

TECHNICAL FIELD

The present invention relates generally to hatches allowing access to building roofs and, in particular, to a system allowing safer opening and closing of a roof hatch.

BACKGROUND ART

Most commercial, industrial and institutional buildings have some means of roof access for maintenance of the roof system and any roof mounted equipment. The usual means of roof access is by way of a stairwell which is built beyond the highest story of the building so that the top of the stair opens onto the roof or by means of a ladder or ship's ladder which leads to a water-tight roof hatch which, when opened, allows the user to climb out through the hatch onto the roof. Roof access ladders are usually steel or aluminum fabrications which meet, to some degree or another, OSHA regulations governing ladder dimensions, attachment, etc. Most roof hatches are hinged on one side and are built with a latching mechanism, which allows the hatch to be locked from the inside by use of a padlock. In addition, most roof hatches have gas shocks (like those on an SUV's lift gate) to make opening the hatch less difficult.

FIGS. 1A and 1B illustrate two examples of conventional ladder/hatch configurations. In both examples, the top of a fixed ladder 10 ends in or at the bottom of a hatch curb 12, which provides a frame for the inside of the opening in the roof 14. A weather-tight hinged hatch lid 16, when closed, prevents unauthorized access both to and from the roof 14 and prevents wind, rain, and snow from leaking inside. When unlocked and opened, the lid 16 allows authorized personnel to climb onto the roof 14 for inspection or maintenance.

The usual configuration of ladder 10 and hatch 16 places the locking handle at the top of the ladder 10 and nearest the person on the ladder 10. Such a configuration requires that the person opening the hatch 16 be able to hold onto the ladder 10, find the correct key (usually on a ring holding multiple building keys), get the key into the lock with one hand (or if the person is particularly adept, use two hands by finding a place other than the ladder rungs to put a foot while using both hands on the padlock), remove the padlock, put it in a secure location, and then open the hatch 16. Anyone performing such a precarious sequence can relate that it is a white-knuckle experience, no matter how often it is done.

However, the process is not yet complete. Because the access ladder 10 usually ends within a few inches of the hatch curb 12, the person on the ladder 10 must climb out by holding the hatch curb 12 and climb further up the ladder 10 until they can get a foot out onto the roof 14. This usually puts the climber into a doubled over position, similar to one's posture when touching one's toes.

After completing the task on the roof 14, it is necessary to reverse the procedure, which starts with holding the top of the curb 12 (about four inches above the roof surface 14), getting a foot on the top rung of the ladder 10 to begin the climb back down, and stopping to close and re-lock the hatch 16. At this point, the gas shocks make closing the hatch 16 more difficult because, while they make opening the hatch 16 easier, they resist closing the hatch 16.

It will be appreciated, therefore, that transitioning from the top of the ladder 10, over the curb 12, and onto the surface of the roof 14, and reversing the process, can be difficult and dangerous, particularly when the ladder is vertical as in FIG. 1B.

A number of devices attempt to solve the problem of making the transition easier and safer. However, they may in fact make getting out of the hatch even more difficult and, therefore, less safe. One such device 20 is illustrated in FIG. 2A. The device 20 bolts onto the hatch curb 12 and extends above the curb 12, providing an additional, higher handhold when climbing up onto or down from the roof. Another such device 30 is illustrated in FIG. 2B. The device 30 is a telescoping post having a lower section 30A that clamps onto the ladder 10. When the user is at the top of the ladder 10 and has opened the hatch lid 16, the user raises the upper section 30B of the post 30 so that it extends above the curb 12 and locks it in place. The user may then hold on to the upper section 30B for support as they climb out of the opening, over the curb 12, and onto the roof 14. However, even using these and other such devices can make for a precarious transition.

SUMMARY OF THE INVENTION

A system is provided for safe access to a roof through an opening in a roof of a structure having a fixed ladder leading upward to the opening. The system includes a mechanism to drive a set of pushrods to raise a hatch covering the opening. In one embodiment, the system includes a section of ladder secured to the underside of the hatch. In another embodiment, the system includes an extendable ladder driven by the drive mechanism to slide along the fixed ladder and extend through the opening in the roof when the hatch is raised. In still another embodiment, the system includes a safety pole driven by the drive mechanism to extend through the opening in the roof when the hatch is raised. The system allows someone who needs to access the roof for inspection or maintenance to open the hatch from a safe location, climb up through the opening in the roof, and safely step onto the roof.

and

Figure 6A:
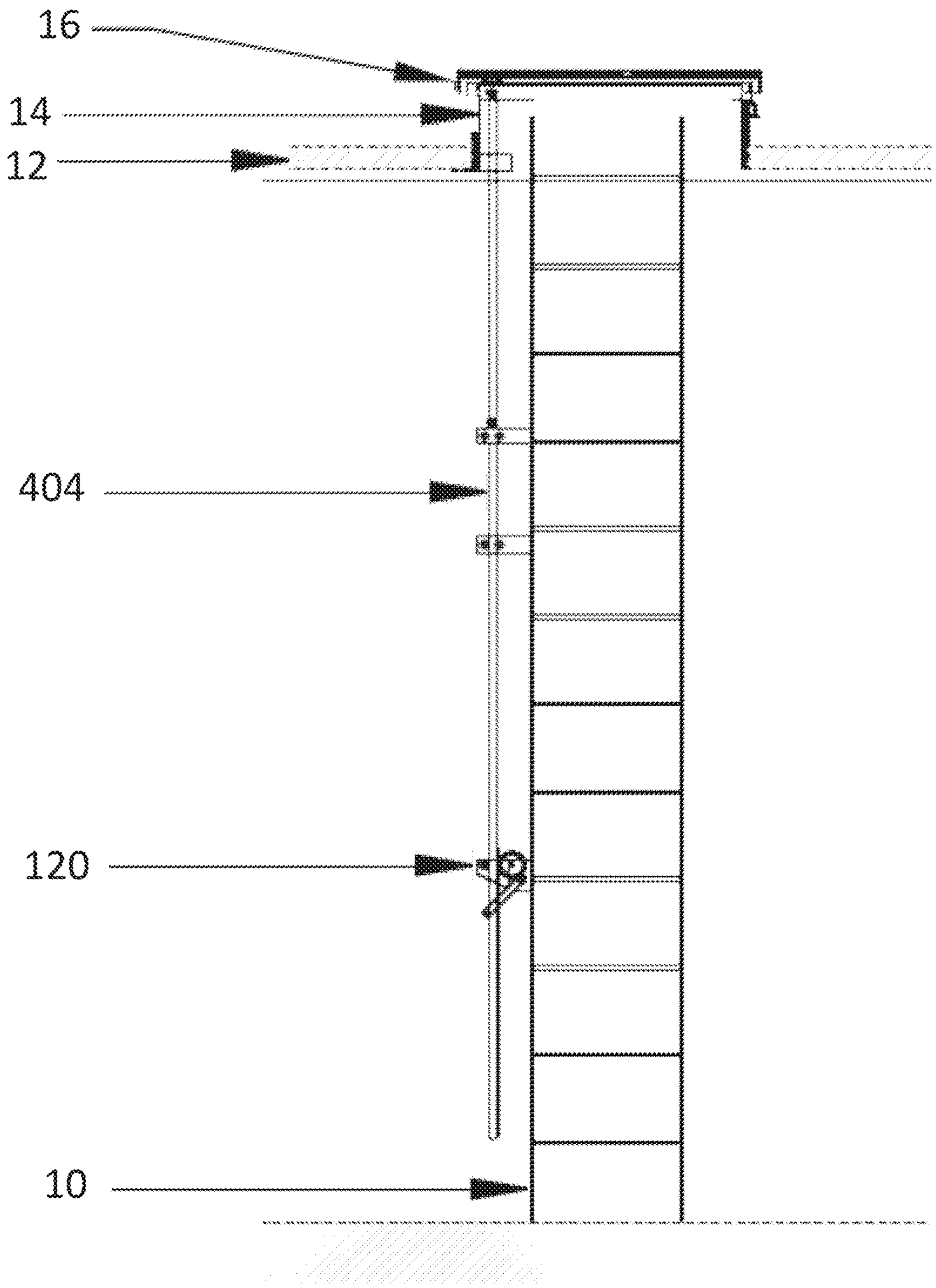
FIG. 6A is a front view of a fourth embodiment of a roof hatch safety system of the present invention in the hatch closed position.
Figure 6B:
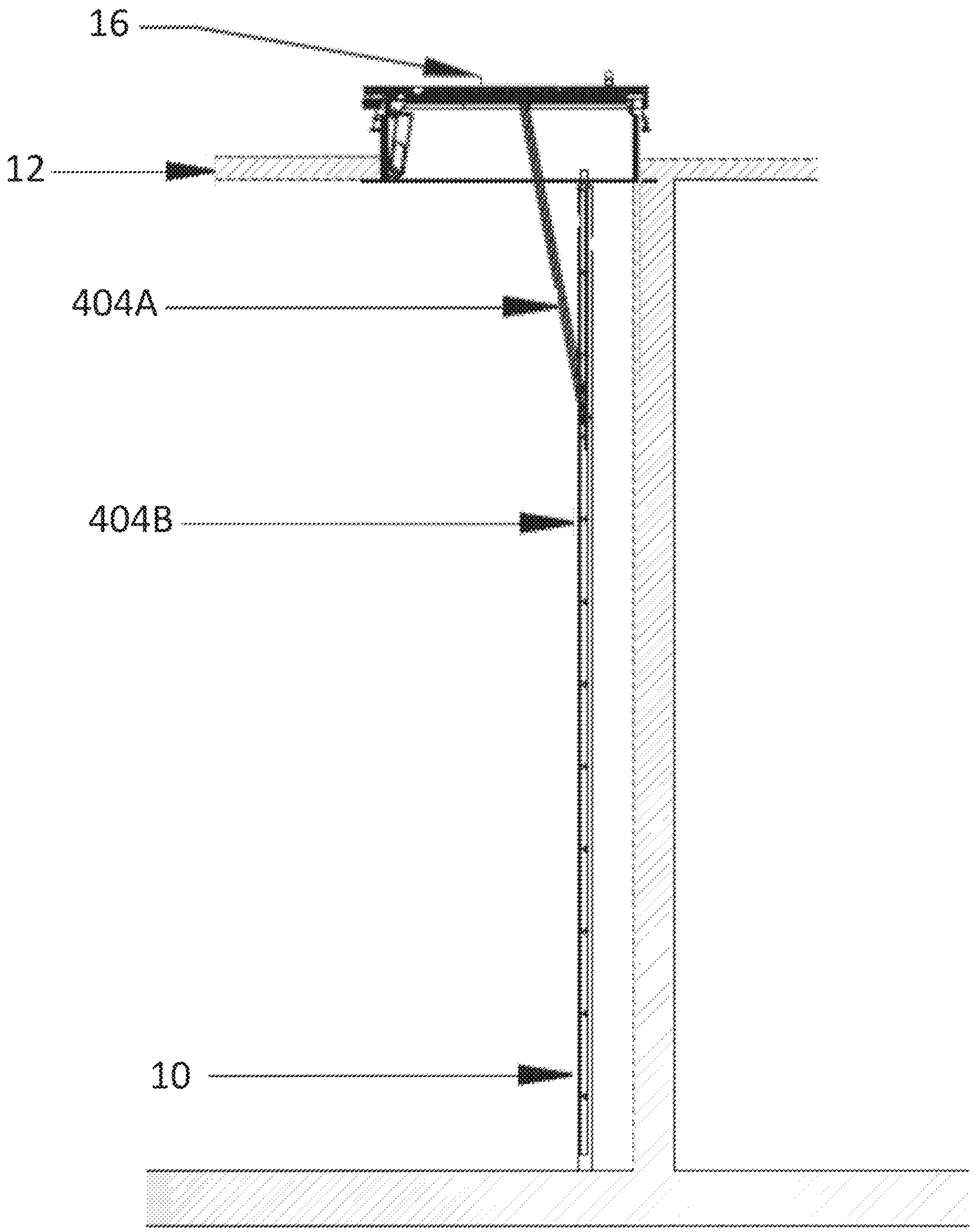
FIG. 6B is a side view of the system of FIG. 6A in the hatch closed position.
Figure 6C:
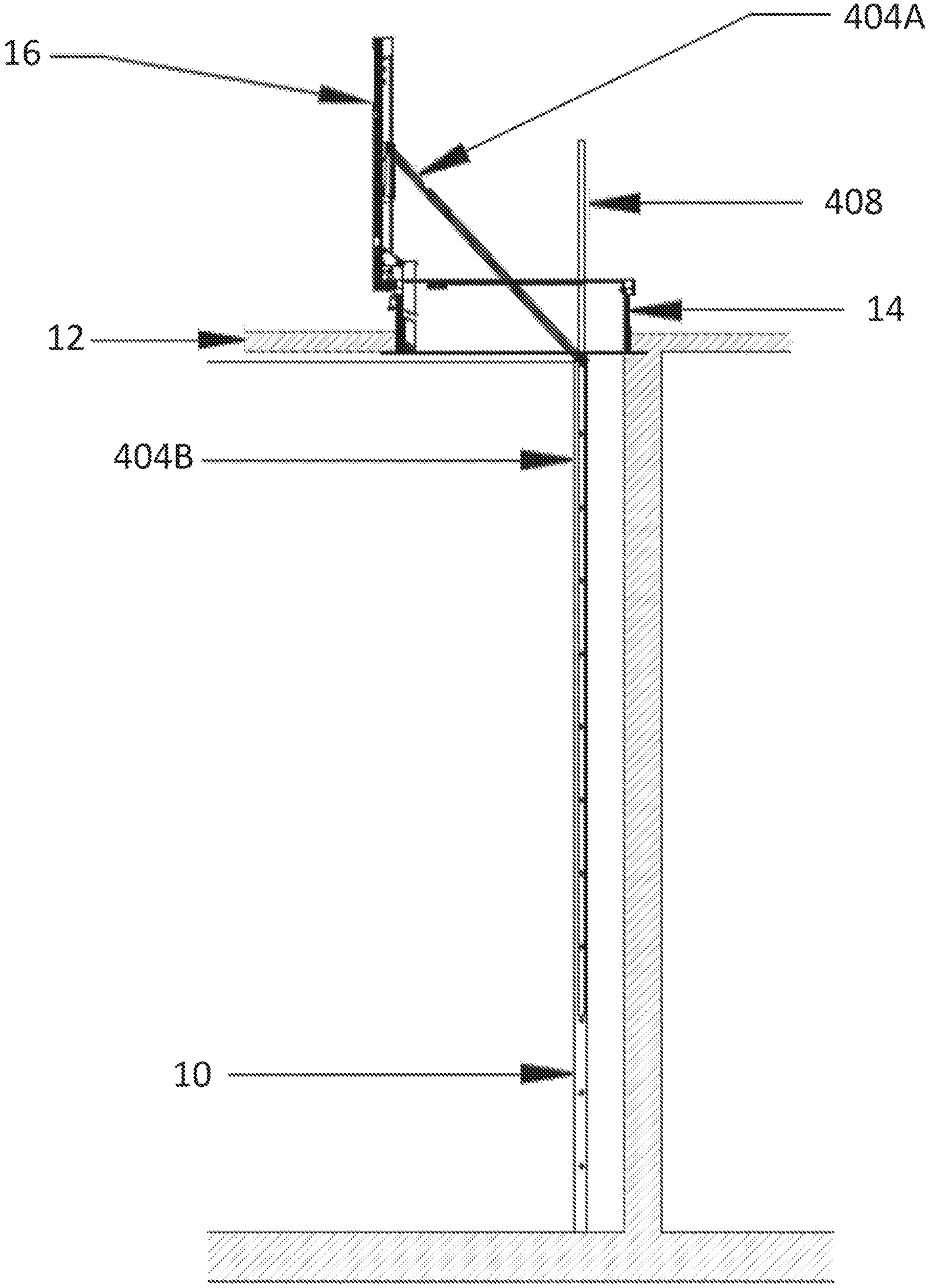

FIG. 6C is a side view of the system of FIG. 6A in the hatch open position.

DETAILED DESCRIPTION OF THE PREFERRED EMBODIMENT

The described features, structures, or characteristics of the invention may be combined in any suitable manner in one or more embodiments. In the following description, numerous specific details are provided to provide a thorough understanding of embodiments of the invention. One skilled in the relevant art will recognize, however, that the invention can be practiced without one or more of the specific details, or with other methods, components and so forth. In other instances, well-known structures, materials, or operations are not shown or described in detail to avoid obscuring aspects of the invention.

Figure 1B:
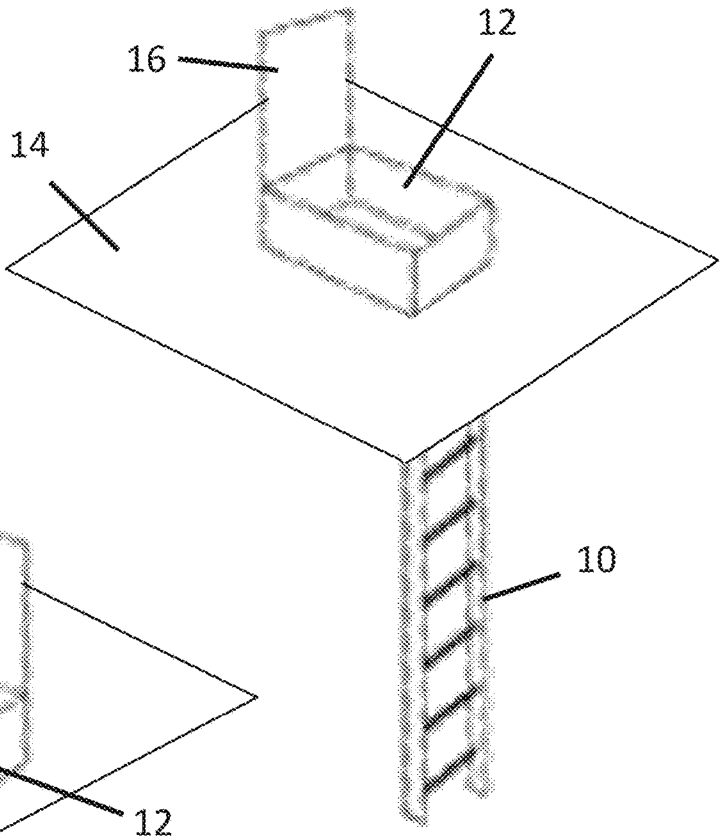
FIG. 1B Prior Art
FIG. 1B illustrates another conventional ladder/hatch configuration.
Figure 1A:
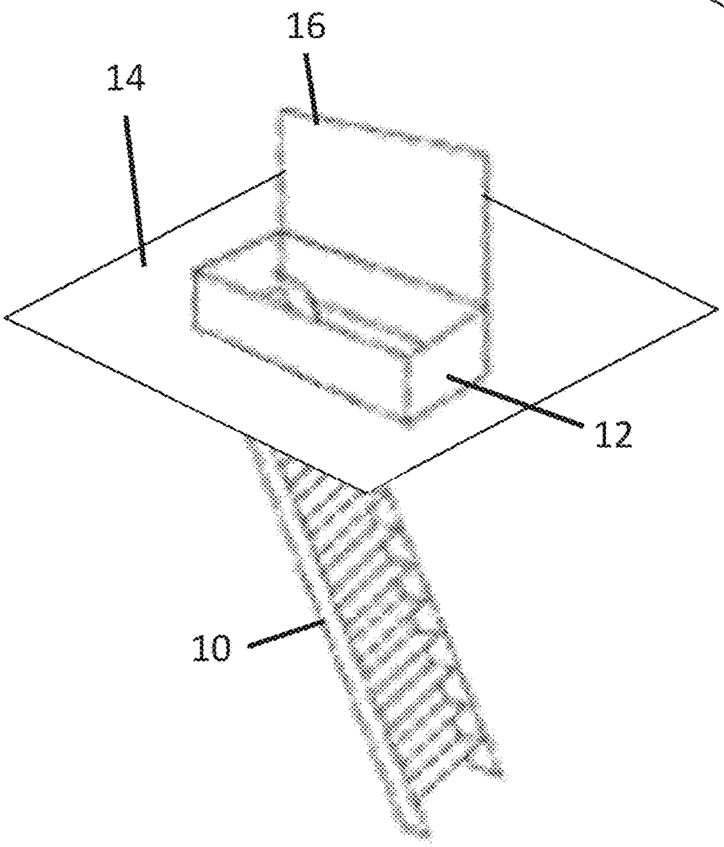
FIG. 1A Prior Art
FIG. 1A illustrates a conventional ladder/hatch configuration.
Figure 2A:
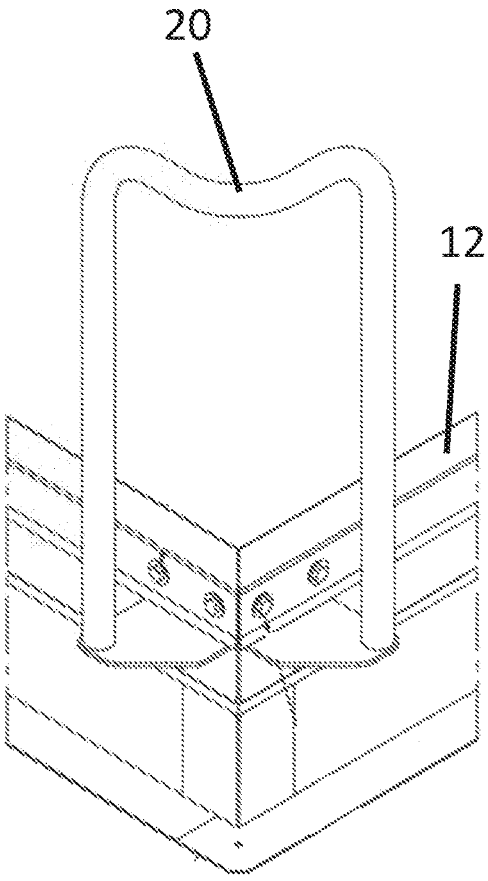
FIG. 2A Prior Art
FIG. 2A illustrates a prior art ladder extension device.
Figure 2B:
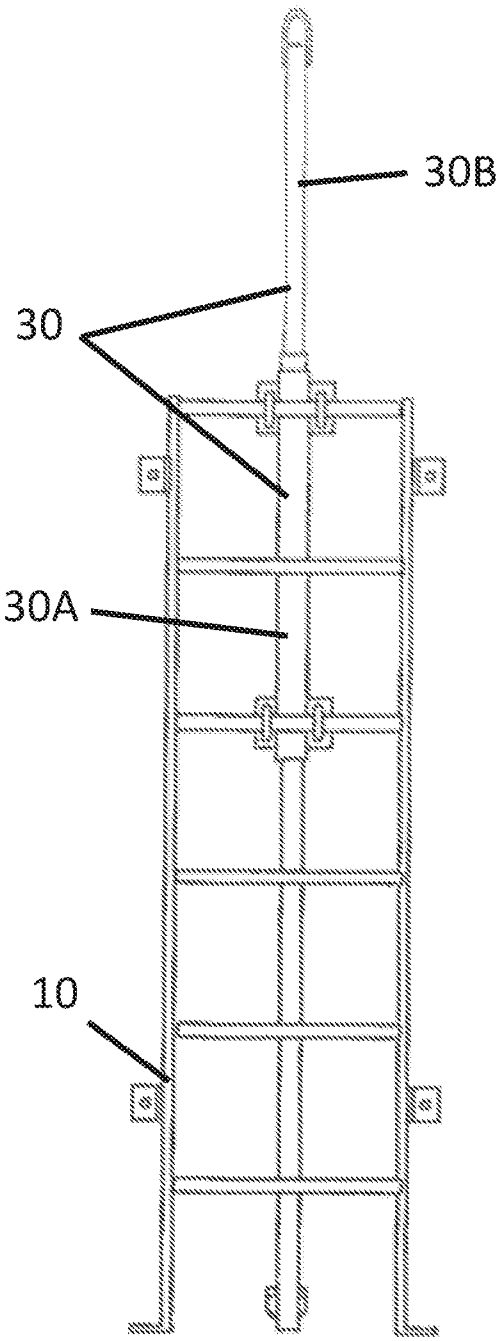
FIG. 2B Prior Art
FIG. 2B illustrates a prior art telescoping support pole.
Figure 3A:
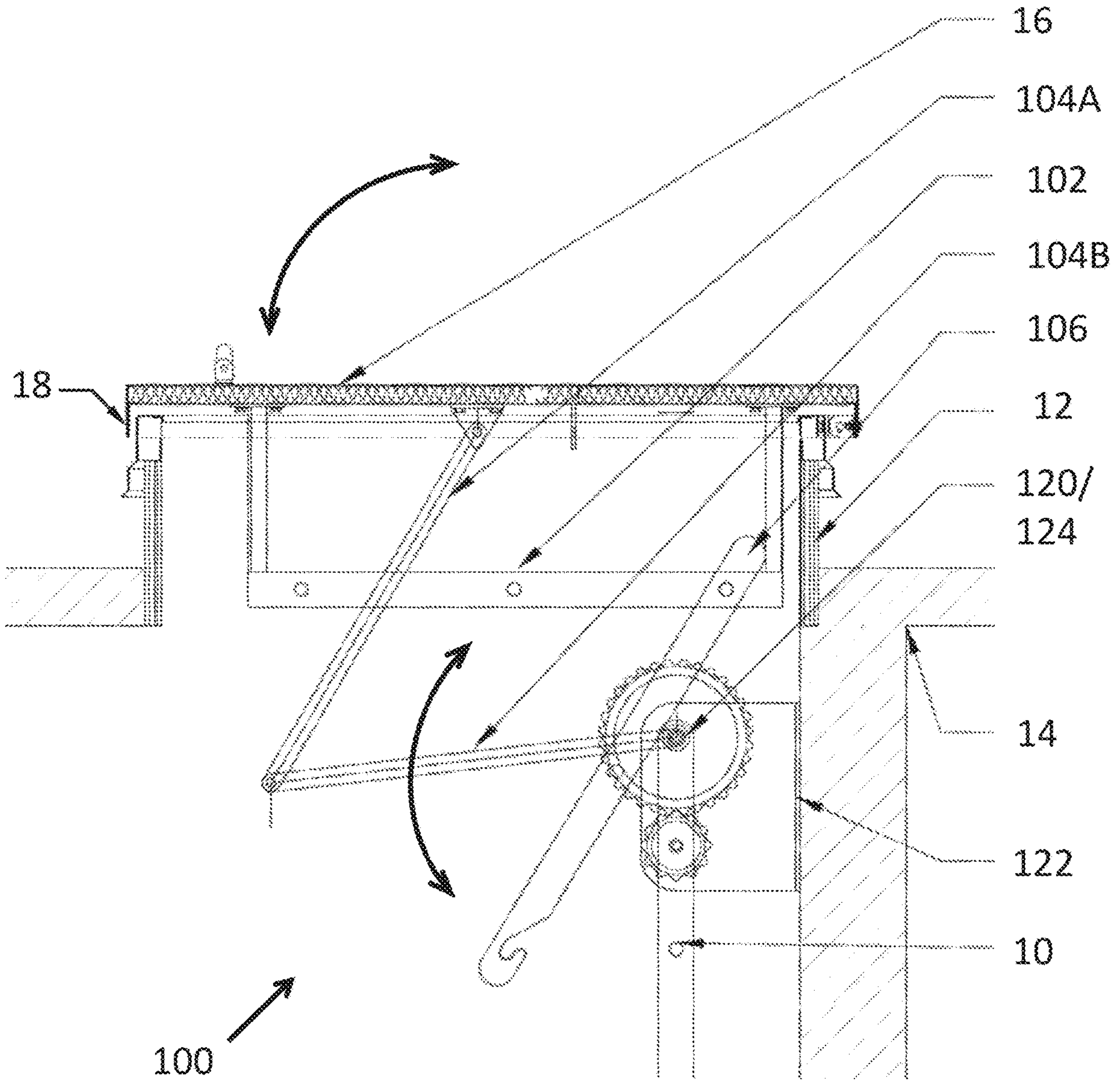
FIG. 3A is a side view of an embodiment of a roof hatch safety system of the present invention in the hatch closed position.
Figure 3B:
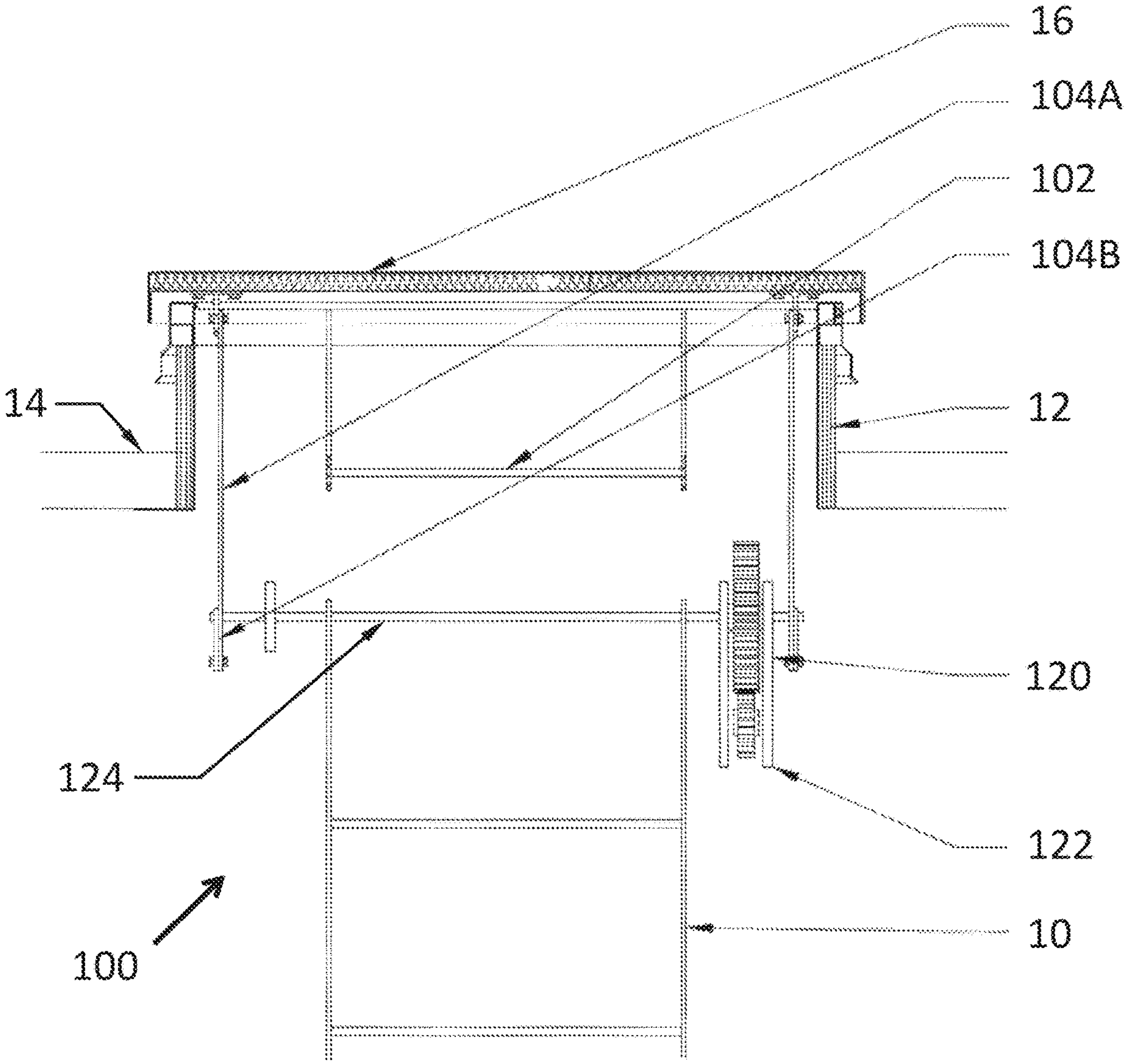
FIG. 3B is a front view of the system of FIG. 3A.
Figure 3C:
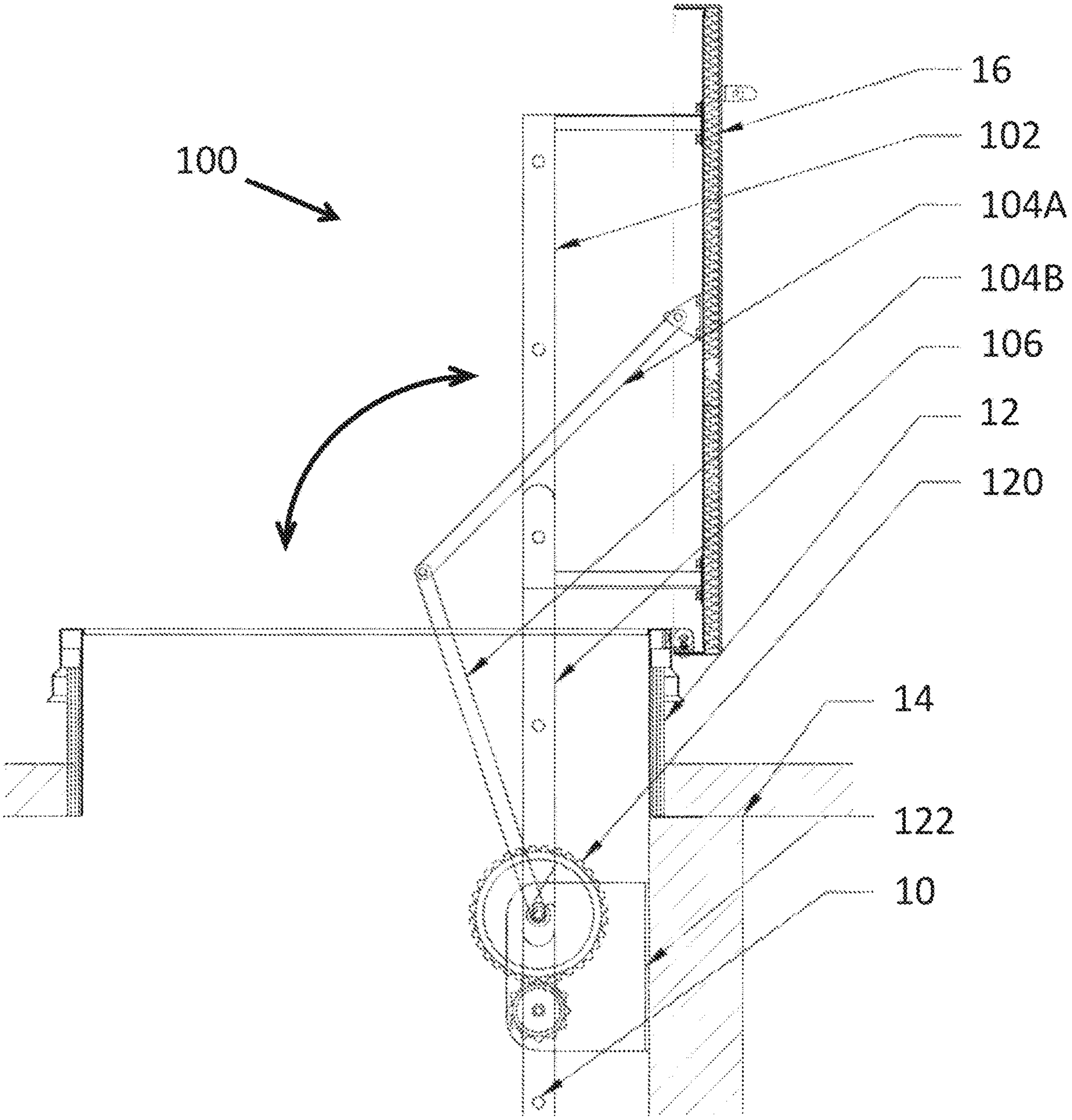
FIG. 3C is a side view of the system of FIG. 3A in the hatch open position.

FIGS. 3A and 3B are side and front views, respectively, of an embodiment of the roof hatch safety system 100 of the present invention with the hatch lid in its closed position. FIG. 3C is a side view of the system 100 with the hatch lid 16 in its open position. The hatch lid 16 is connected to the hatch curb 12 with one or more hinges 18. An existing ladder 10 and hatch lid 16 may be retrofitted with the system 100 or the system 100 may be used as part of a new installation.

The system 100 includes a section of ladder 102 mounted on the underside of the hatch lid 16 with one end (hereinafter "the lower end") close to the hinge side of the hatch lid 16; the opposite ("upper") end of the lid-mounted ladder section 102 extends towards the opposite side of the hatch lid 16. Thus, the ladder section 102 is in a plane substantially parallel to the underside of the lid 10. The system 100 also includes a pair of upper and lower pushrods 104A, 104B, a connecting ladder section 106, and a drive mechanism 120, which is secured with a bracket 122 to the fixed ladder 10 or the inside wall behind or next to the fixed ladder 10.

One end (the "upper end") of each upper pushrod 104A is secured to the underside of the hatch lid 16 and the opposite end (the "lower end") of each is connected through a hinge 104C to one end (the "upper end") of a corresponding lower pushrod 104B. As shown in the front view of FIG. 3B, the opposite end (the "lower end") of each lower pushrod 104B is coupled to the drive mechanism 120 through a drive shaft 124. One end (the "upper end") of each side of the frame of the connecting ladder section 106 is connected through a hinge to the corresponding sides of the frame of the lower end of the lid-mounted ladder section 102. The opposite end (the "lower end") of each side of the frame of the connecting ladder section 106 is shaped like a hook facing the inside wall. When the system 100 and hatch lid 16 are in the closed position, the lower ends of the sides of the connecting ladder section 106 remain free and rest against the outside (relative to the wall) of the drive shaft 124.

When the drive mechanism 120 is operated, the drive shaft 124 rotates and causes the upper and lower pushrods 104A, 104B to rise. The pushrods 104A, 104B in turn push the hatch lid 16 upward. As the hatch lid 16 rises, the hatch-mounted ladder section 102 rises with it, pulling the upper end of the connecting ladder section 106 with it. When the hatch lid 16 is fully in the open position, the pushrods 104A, 104B firmly hold the hatch lid 16 upright and prevent it from closing. In addition, the hooked lower ends of the sides of the connecting ladder section 106 mate with the drive shaft 124 or the upper end of the fixed ladder 10, thereby connecting the fixed ladder 10 with the hatch-mounted ladder section 102 and forming a continuous ladder from the bottom of the fixed ladder 10 onto the hatch lid 16. In this way, someone who needs to access the roof for inspection or maintenance, is able to open the hatch lid 16 from a safe position and climb up the fixed ladder 10, through the opening in the roof 14 onto the connecting ladder section 106 and the hatch-mounted ladder section 102, and then safely step over the hatch curb 12 onto the roof 14.

Figure 4A:
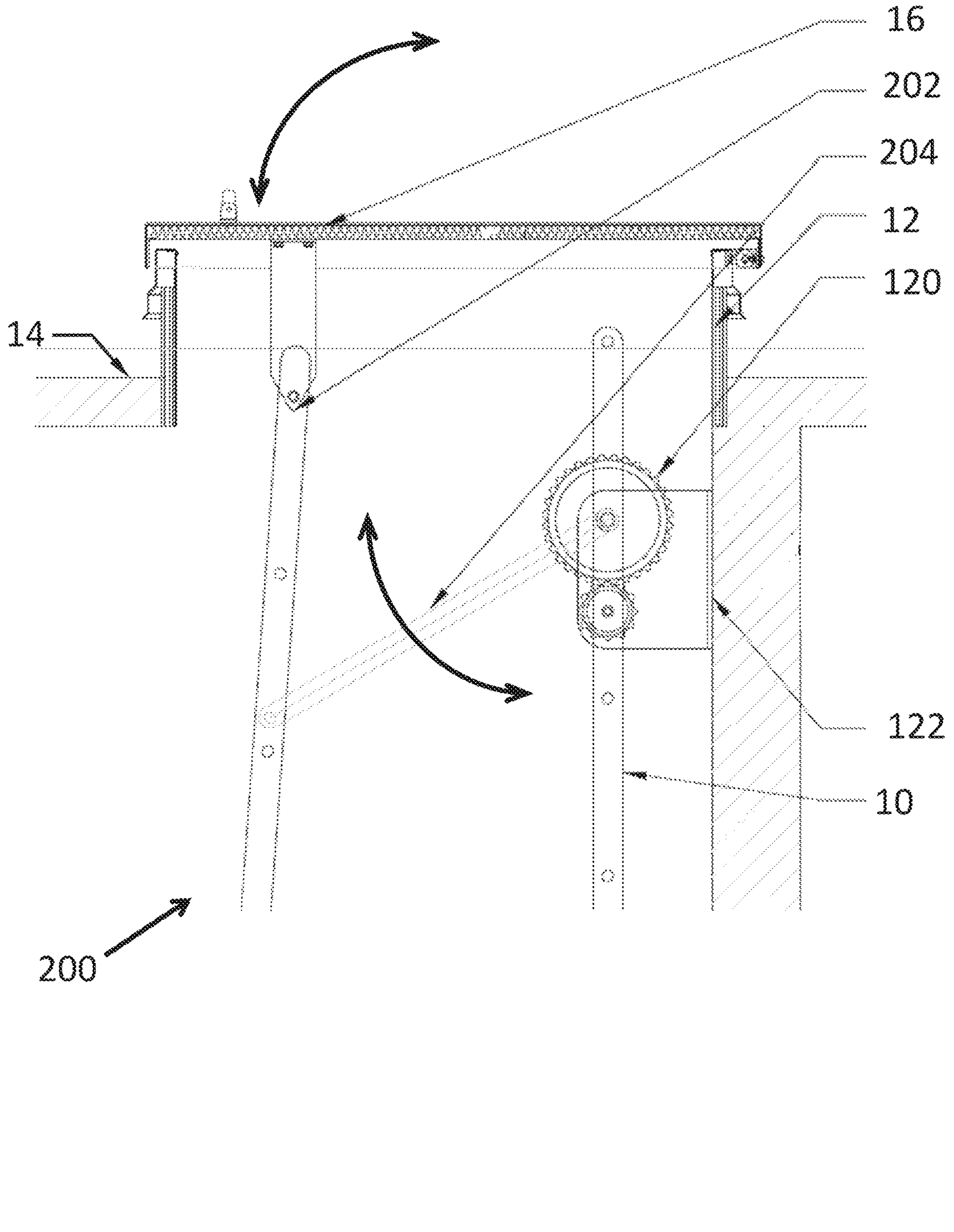
FIG. 4A is a side view of another embodiment of a roof hatch safety system of the present invention in the hatch closed position.
Figure 4B:
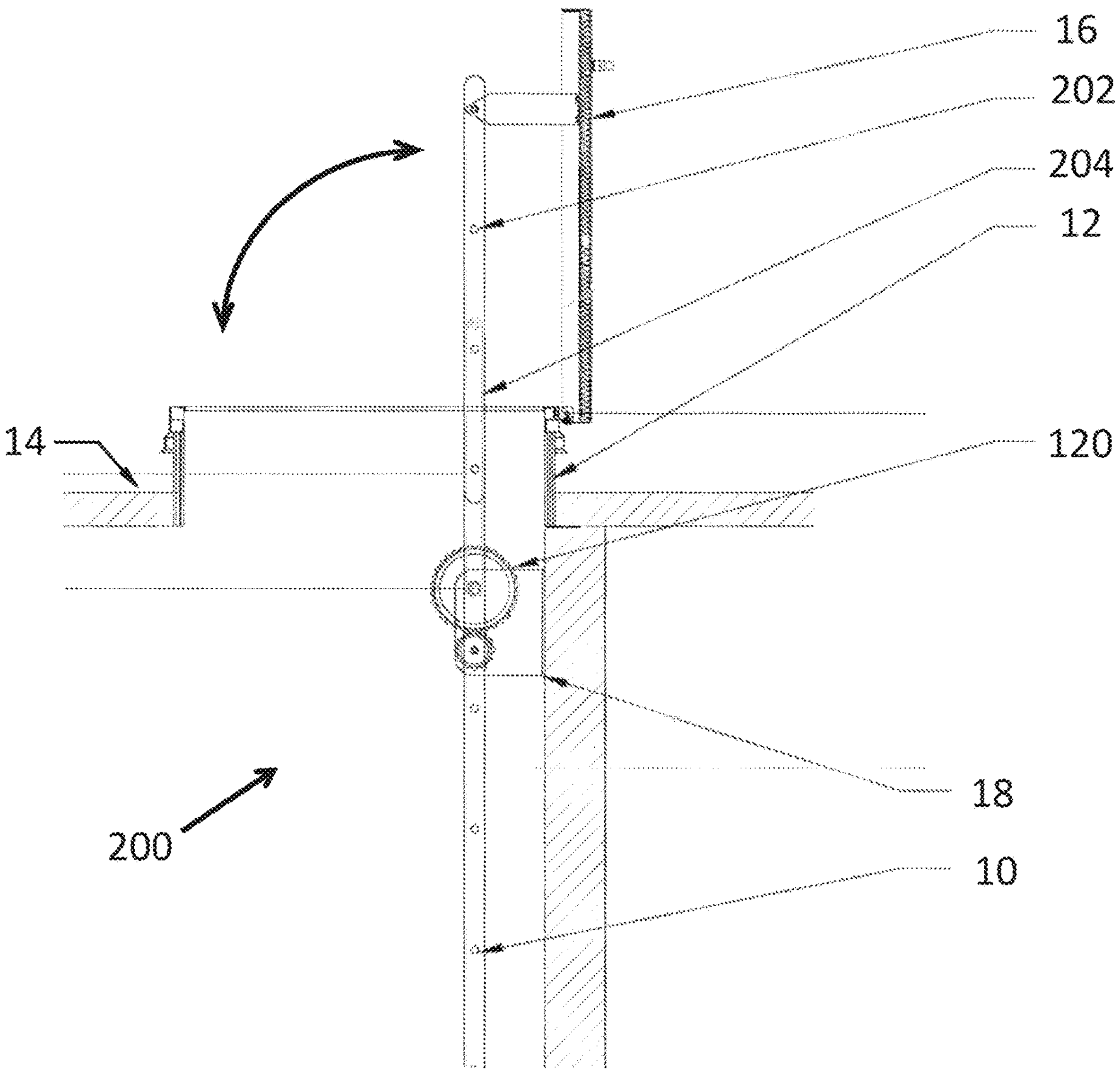
FIG. 4B is a side view of the system of FIG. 4A in the hatch open position.

FIGS. 4A and 4B illustrate side views of another embodiment of a roof hatch safety system 200 of the present invention in the hatch closed and open positions, respectively. The system 200 includes a ladder section 202 that is connected at its upper end to the hatch lid 16 with hinges. A pushrod 204 is coupled at its lower end to the drive mechanism 120 and the opposite end is coupled to the hatch-mounted ladder section 202 below the upper end of the hatch-mounted ladder section 202. When the drive mechanism 120 is activated, the upper end of the pushrod 204 rises, lifting the hatch lid 16 and with it the hatch-mounted ladder section 202. When the hatch lid 16 is fully open, as in FIG. 4B, the hatch-mounted ladder section 202 is contiguous with the fixed ladder 10, forming a continuous ladder from the bottom of the fixed ladder 10 onto the hatch lid 16. As with the system 100 illustrated in FIGS. 3A-3C, someone who needs to access the roof for inspection or maintenance, is able to open the hatch lid 16 from a safe position and climb up the fixed ladder 10, through the opening in the roof 14 onto the hatch-mounted ladder section 202, and then safely step over the hatch curb 12 onto the roof 14.

Figure 5A:
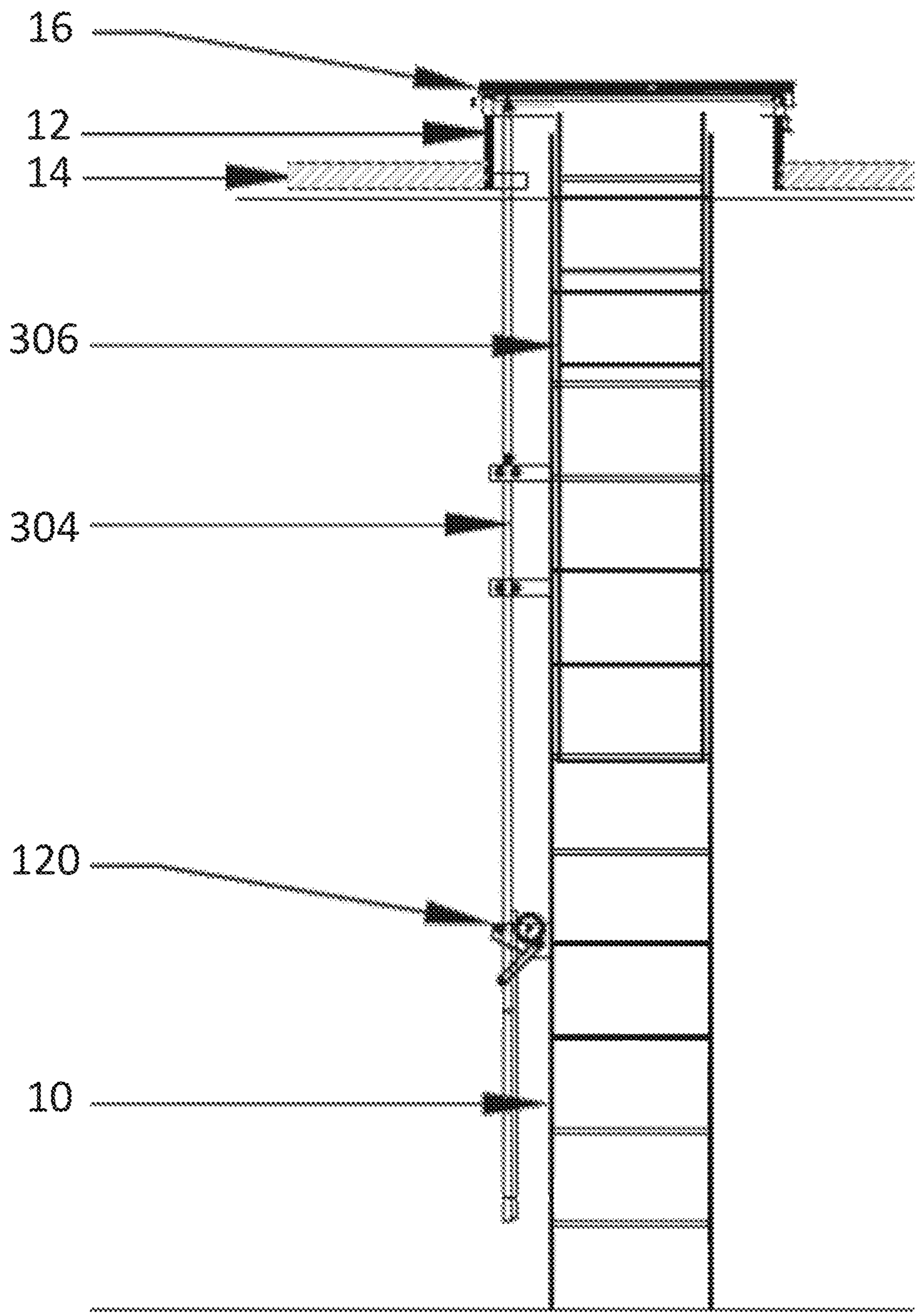
FIG. 5A is a front view of a third embodiment of a roof hatch safety system of the present invention in the hatch closed position.
Figure 5B:
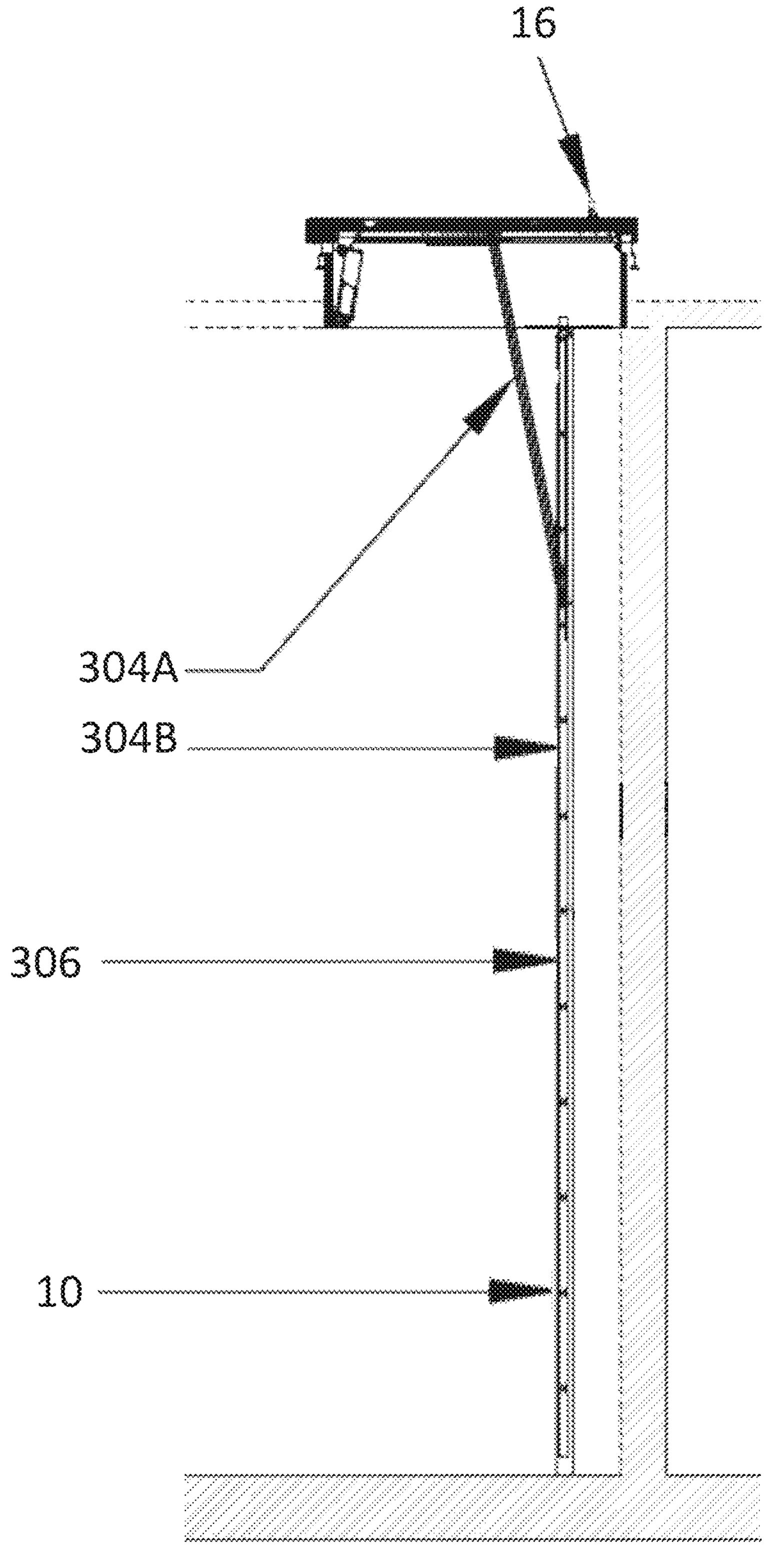
FIG. 5B is a side view of the system of FIG. 5A in the hatch closed position.
Figure 5C:
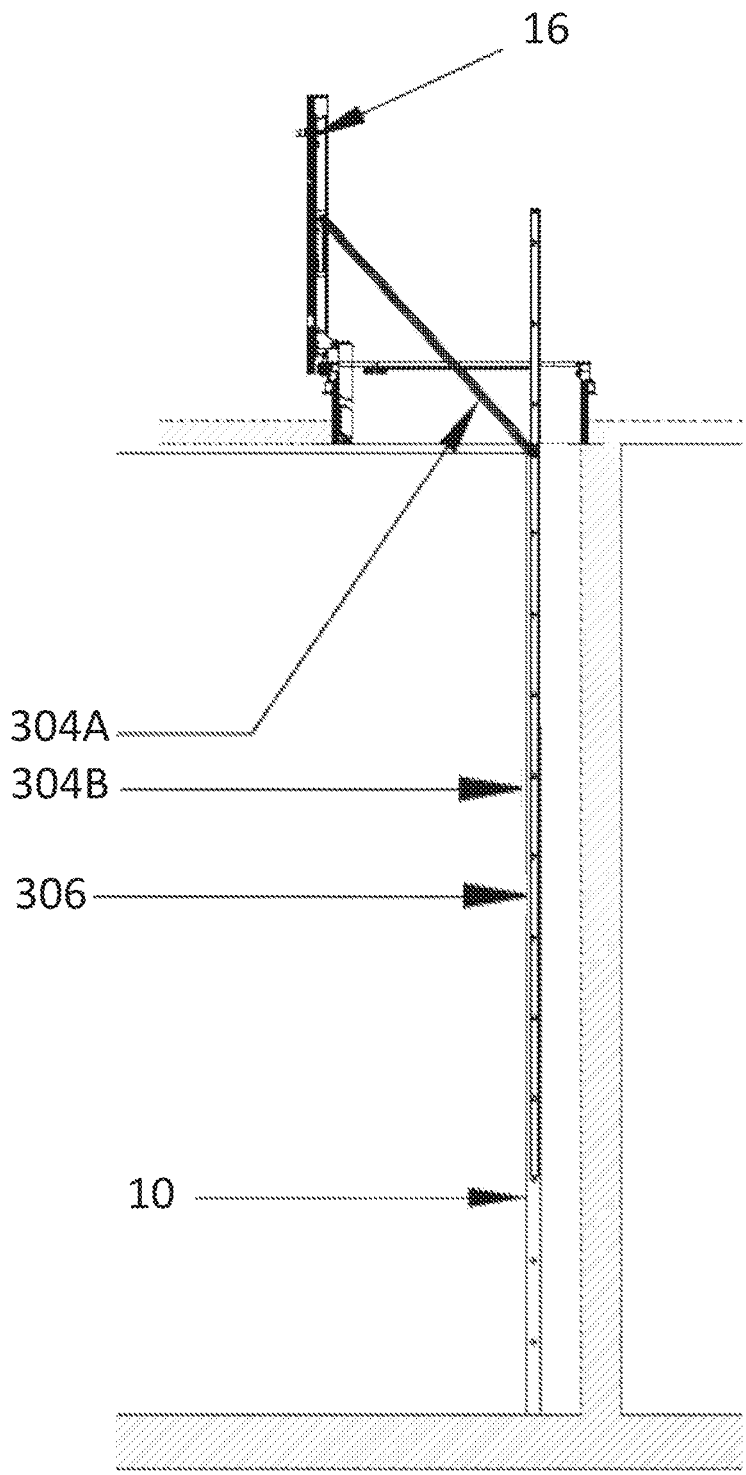
FIG. 5C is a side view of the system of FIG. 5A in the hatch open position.

FIGS. 5A, 5B, and 5C illustrate a third embodiment of a roof hatch safety system 300 of the present invention. In the system 300, the drive mechanism 120 raises and lowers a pushrod 304, the top section 304A of which is attached with a hinge or pivot to both the lower section 304B and the underside of the hatch lid 16 and is also attached to a sliding ladder extension 306. When the drive mechanism 120 is operated in one direction, the pushrod 304 is raised to open the lid 16. The ladder extension 306 also rises and extends upward through the opening in the roof (FIG. 5C), allowing a user to safely climb up the ladder through the hatch and step onto the roof 14. When the drive mechanism 120 is operated in the opposite direction, the pushrod 304 retracts the ladder extension 306 and closes the lid 16.

FIGS. 6A, 6B, and 6C illustrate a fourth embodiment of a roof hatch safety system 400, similar to the third embodiment 300 but with a safety pole 408 instead of a ladder extension. The drive mechanism 120 raises and lowers a pushrod 404, to which the safety pole 408 is attached. A top section 404A of the pushrod 404 is attached with a hinge or pivot to both a lower section 404B and the underside of the hatch lid 16. When the drive mechanism 120 is operated in one direction, the pushrod 304 is raised to open the lid 16 (FIG. 6C). The connected safety pole 408 also rises and extends through the opening in the roof 14, allowing a user to safely climb up the ladder through the hatch and step onto the roof 14 while holding onto the pole 408. When the drive mechanism 120 is operated in the opposite direction, the pushrod 404 retracts the pole 408 and closes the lid 16.

The systems 300 and 400 may be included as part of a new installation or may be retrofitted to an existing installation.

In the various embodiments, the drive mechanism 120 may be hand operated, such as with a hand crank. Alternatively, the drive mechanism 120 may include an electric motor. Although the drive mechanism 120 may be operated at the top of the fixed ladder, for safety and convenience it is preferable that it be operated from the bottom of the ladder 10. When the drive mechanism 120 is operated from the bottom of the fixed ladder 10, the hand crank or motor may be coupled to the drive mechanism 120 through any appropriate device, such as a drive rod, gear and chain, or the like. Whether located at the hatch lid 16 or the bottom of the ladder 10 and whether hand operated or electrically driven, the drive mechanism 120 is preferably lockable to prevent unauthorized use.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A safety system for accessing a roof through a hinged roof hatch extending over an opening in the roof, the system comprising:

a pushrod;

a hatch-mounted ladder section pivotally connected to the pushrod and operatively connected to the roof hatch;

a fixed ladder; and a drive mechanism connected to the pushrod and configured to move the pushrod and elevate the hatch-mounted ladder section and raise the roof hatch and extend the hatch-mounted ladder section through the opening in the roof to form a continuous ladder from the bottom of the fixed ladder and through the hatch-mounted ladder section.

2. The safety system of claim 1, wherein the drive mechanism is hand operated.

3. The safety system of claim 2, wherein the hand operated drive mechanism is operated from the bottom of the fixed ladder.

4. The safety system of claim 2, wherein the hand operated drive mechanism is operated from the top of the fixed ladder.

5. The safety system of claim 1, wherein the drive mechanism is motorized.

6. The safety system of claim 1, wherein the drive mechanism is configured to move the hatch-mounted ladder section over the fixed ladder such that the hatch-mounted ladder section is vertically aligned with the fixed ladder, enabling access to the roof via both the fixed ladder and the hatch-mounted ladder section.

7. The safety system of claim 1, wherein the drive mechanism is configured such that when the roof hatch is in an open position, the fixed ladder, drive mechanism, and hatch-mounted ladder section are all aligned.

* * * * *